United States Patent
Rhodes

(10) Patent No.: US 7,693,224 B2
(45) Date of Patent: Apr. 6, 2010

(54) SUBCARRIER ADAPTIVE THRESHOLDING

(75) Inventor: Valentine J. Rhodes, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 951 days.

(21) Appl. No.: 11/094,827

(22) Filed: Mar. 30, 2005

(65) Prior Publication Data

US 2006/0222091 A1    Oct. 5, 2006

(51) Int. Cl.
*H04K 1/10* (2006.01)

(52) U.S. Cl. .................. 375/260; 375/219; 375/222; 375/322; 455/73; 370/207

(58) Field of Classification Search .......... 375/260, 375/219, 222, 322; 455/73; 370/207
See application file for complete search history.

(56) References Cited

U.S. PATENT DOCUMENTS

| | | | |
|---|---|---|---|
| 6,879,840 B2 * | 4/2005 | Razavilar et al. .......... 455/522 |
| 2002/0102940 A1 * | 8/2002 | Bohnke et al. ............ 455/23 |
| 2003/0063661 A1 * | 4/2003 | Ahmed et al. ............ 375/225 |
| 2003/0104831 A1 * | 6/2003 | Razavilar et al. ......... 455/522 |
| 2003/0236071 A1 | 12/2003 | Ito |
| 2004/0228417 A1 * | 11/2004 | Kennedy et al. .......... 375/260 |
| 2004/0264362 A1 | 12/2004 | Rhodes |
| 2004/0264431 A1 | 12/2004 | Rhodes |
| 2005/0030887 A1 * | 2/2005 | Jacobsen et al. .......... 370/208 |
| 2005/0034053 A1 | 2/2005 | Jacobsen et al. |
| 2006/0067416 A1 * | 3/2006 | Tirkkonen et al. ......... 375/260 |

FOREIGN PATENT DOCUMENTS

| | | |
|---|---|---|
| EP | 1387517 A1 | 2/2004 |
| WO | WO-2006/105522 A2 | 10/2006 |

OTHER PUBLICATIONS

"Frequency-division multiplexing", *Wikipedia—The Free Encyclopedia*, http://web.archive.org/web/20041028193204/http://en.wikipedia.org/wiki/Frequency-division_multiplexing, (archived Jun. 16, 2004), 1 pg.

"Partial International Search Report for corresponding PCT Application No. PCT/US2006/012588", (Sep. 6, 2006), 4 pgs.

* cited by examiner

*Primary Examiner*—David C Payne
*Assistant Examiner*—Zewdu Kassa
(74) *Attorney, Agent, or Firm*—Cool Patent, P.C.; Kenneth J. Cool; Joseph P. Curtin

(57) ABSTRACT

A communication device may obtain a channel estimate, and may adjust power thresholds governing an adaptive bit loading scheme. The communication device may include a transceiver arranged to receive data from a remote transmitter on a plurality of subcarriers. The communication device may also include a controller coupled to the transceiver. Finally, a memory unit may be coupled to the controller. The memory unit may contain a set of instructions that when executed cause the controller to cooperate with the transceiver to create a channel estimate, to create modulation criteria based at least in part on the channel estimate, and to command the remote transmitter, on a subcarrier-by-subcarrier basis, to employ a particular modulation technique on a particular subcarrier. Such a command may be based at least in part on a comparison of the channel estimate and the modulation criteria.

16 Claims, 7 Drawing Sheets

SUBCARRIER ADAPTIVE THRESHOLDING

TECHNICAL FIELD

Embodiments of the present invention relate to communication systems, and more particularly to communication systems employing adaptive bit loading schemes that utilize dynamic thresholds to determine the modulation scheme employed on a particular subcarrier.

BACKGROUND

Some existing communication schemes involve the use of many subcarriers. For example, a wireless communication scheme may employ fifty or more subcarriers, each having a bandwidth of many hundreds kilohertz. Encoded data bits may be interleaved amongst the various subcarriers, and represented as transmission symbols modulated upon the various subcarriers.

Depending upon the physical environment in which the receiver and transmitter are located, some of the subcarriers may exhibit more power than others when received by the receiver. The subcarriers that exhibit a greater power at the receiver are able to carry a greater number of bits per transmission symbol than subcarriers exhibiting a relatively lesser power. Adaptive bit loading schemes make use of this phenomena.

Adaptive bit loading schemes have generally worked as follows. Initially, every subcarrier is assumed to exhibit a sufficient power level to support the most complex form of modulation employed by the communication system. For example, a communication system may employ 64-quadrature amplitude modulation (64-QAM), 16-QAM, quadrature phase shift keying (QPSK), and binary phase shift keying (BPSK). In such a system, each subcarrier is initially assumed to exhibit a sufficient power level to support 64-QAM (which communicates 6 bits per transmission symbol). Therefore, each transmission packet communicated on each subcarrier is encoded using 64-QAM. The transmitter continues to use 64-QAM, until a particular subcarrier is demonstrated to exhibit insufficient power to support such a modulation scheme. Upon such an occurrence, a less sophisticated modulation scheme is used for that particular subcarrier (e.g., 16-QAM, which communicates 4 bits per transmission symbol, may be used). If, at any time, the particular subcarrier is demonstrated to be incapable of supporting 16-QAM, an even less sophisticated modulation scheme may be assigned to the particular subcarrier (e.g., the subcarrier may be assigned to use QPSK, which communicates two bits per transmission symbol).

One shortcoming of the aforementioned scheme is that once a less sophisticated modulation scheme is assigned to a particular subcarrier, the subcarrier will not be re-assigned a more sophisticated scheme for the duration of the connection. This means that, given such a scheme, the data rate may erode over the course of a connection, but cannot regenerate.

DETAILED DESCRIPTION

Figure 1:
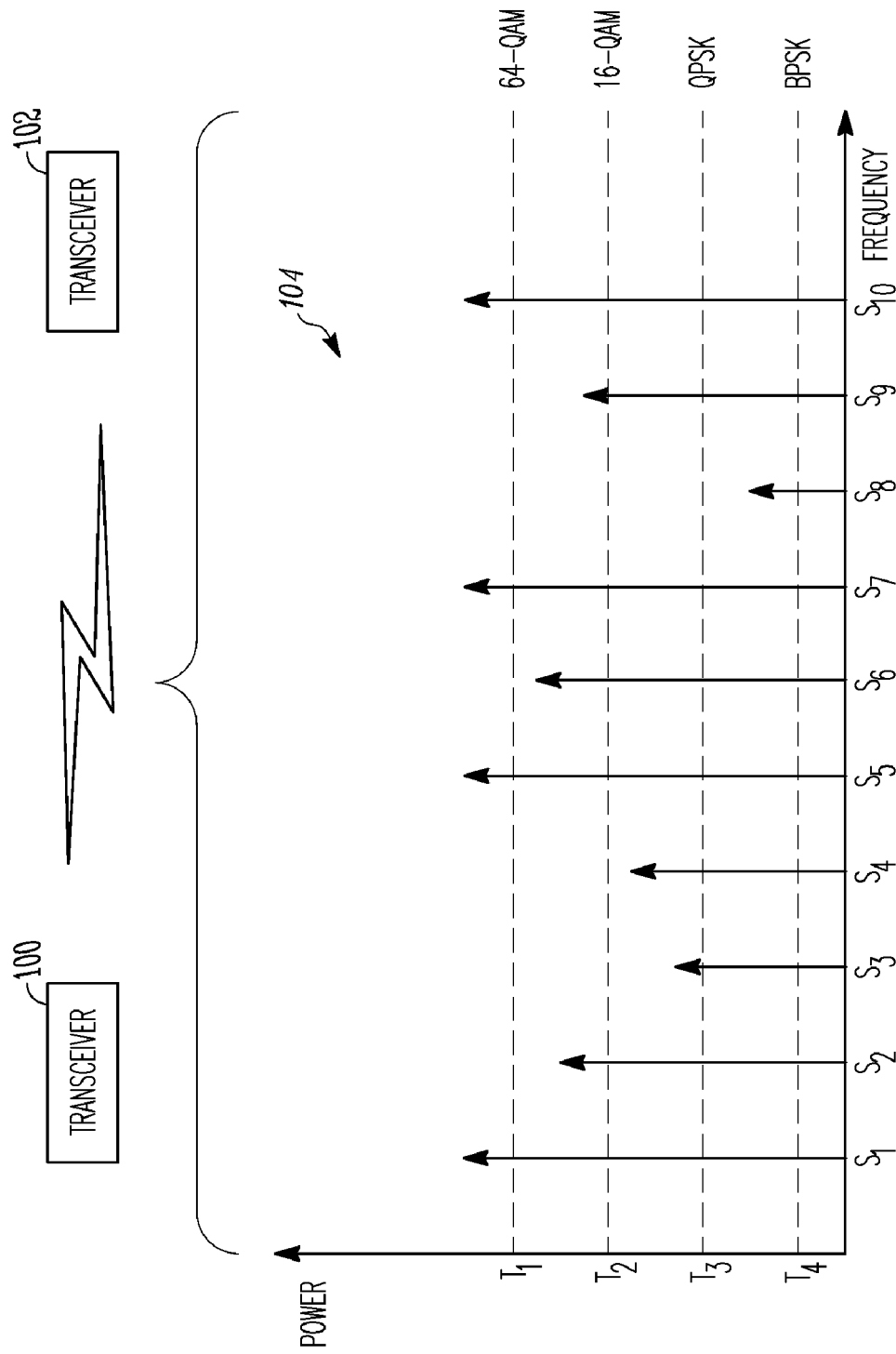
FIG. 1 depicts a first and second transceiver communicating according to a power thresholding scheme, in accordance with some embodiments of the present invention.

FIG. 1 depicts a first and second transceiver 100 and 102 communicating according to a power thresholding scheme described by a chart 104. Each transceiver 100 and 102 may include transmitting and receiving circuitry, such as that described with reference to FIGS. 8 and 9. Although the transceivers 100 and 102 may both receive and transmit data to and from one another, for the sake of simplicity, transceiver 100 is described herein as engaging in the act of transmitting data (and is sometimes referred to herein as a transmitter), and transceiver 102 is described herein as engaging in the act of receiving data (and is sometimes referred to herein as a receiver).

In the example depicted in FIG. 1, transceiver 100 communicates with transceiver 102 by virtue of simultaneous transmission over ten subcarriers $S_1$-$S_{10}$. In principle, any plural number of subcarriers may be used with embodiments of the invention described herein. Each of the subcarriers $S_1$-$S_{10}$ is depicted in the chart 104, represented by impulse functions at regular intervals along the x-axis.

A transmission from transceiver 100 to transceiver 102 propagates through a channel, and is ultimately received by transceiver 102. The channel may influence the strength of the signals received by transceiver 102. Such influence is depicted by the chart 104. The chart 104 illustrates the power, as observed at the receiver (transceiver 102), contained in the various signals carried on the various subcarriers $S_1$-$S_{10}$. As already mentioned, the x-axis of the chart measures frequency; the y-axis measures power. The strength of a given subcarrier $S_1$-$S_{10}$, as observed by transceiver 102, is revealed by the height of the impulse function representing the given subcarrier $S_1$-$S_{10}$. Thus, as can be seen from the chart 104, the signals carried on subcarriers $S_1$, $S_6$, $S_7$, and $S_{10}$ are relatively strong, when observed by transceiver 102. On the other hand, the signal carried on subcarrier $S_8$ is relatively weak, when observed by transceiver 102.

Since transceiver 100 transmits signals with a substantially constant power level from subcarrier to subcarrier, the observed relative differences in power level at the various subcarriers $S_1$-$S_{10}$ reflect the influence of the channel upon the transmitted signals. The channel may change over time, meaning that the power levels observed by transceiver 102 at the various subcarriers $S_1$-$S_{10}$ may also change over time. The significance of such change is discussed below.

The transceivers 100 and 102 employ an adaptive bit loading scheme to accommodate the influence of the channel upon the signals carried atop the various subcarriers $S_1$-$S_{10}$. The adaptive bit loading scheme utilizes power thresholds $T_1$-$T_4$, which are illustrated in FIG. 1. Per the adaptive bit loading scheme, the number of bits carried by a transmission symbol at a given subcarrier $S_1$-$S_{10}$ is determined by the thresholds $T_1$-$T_4$. According to the exemplary scheme, 64-QAM (6 bits per symbol) is employed on a given subcarrier, if the power level of the signal carried on that subcarrier meets or exceeds threshold $T_1$. Thus, 64-QAM is employed on subcarriers $S_1$, $S_5$, $S_7$, and $S_{10}$. As shown by the chart 104, 16-QAM (4 bits per symbol) is employed on a given subcarrier, if the power level of the signal carried on that subcarrier meets or exceeds threshold $T_2$, but falls short of threshold $T_1$. 16-QAM is employed on subcarriers $S_2$, $S_6$, and $S_9$. Similarly, QPSK (2 bits per symbol) is employed on a given subcarrier, if the power level of the signal carried on that subcarrier meets or exceeds threshold $T_3$, but falls short of threshold $T_2$. QPSK is employed on subcarriers $S_3$ and $S_4$. Finally, BPSK (1 bit per symbol) is employed on a given subcarrier, if the power level of the signal carried on that subcarrier meets or exceeds threshold $T_4$, but falls short of threshold $T_3$. BPSK is employed on subcarrier $S_8$. Other schemes may follow a similar approach, but may employ a different number of thresholds, and may employ different modulation techniques.

As discussed previously, the chart 104 depicted in FIG. 1 represents the influence of the channel, at a particular point in time, upon the signals propagating from transceiver 100 to transceiver 102. At a subsequent point in time, the channel may have changed, meaning that its influence on the signals carried at the various subcarriers $S_1$-$S_{10}$ may have changed, as well. The channel may change, for instance, because one or both of the transceivers 100 and 102 may change locations, atmospheric conditions may change, etc. As the channel changes, it may be desirable to adjust the thresholds $T_1$-$T_4$ to accommodate such change. By adjusting the thresholds $T_1$-$T_4$, it may be possible, for example, to maintain a relatively constant bit rate or bit error rate, in spite of the changing signal strength of the signals carried atop the various subcarriers $S_1$-$S_{10}$.

Figure 2:
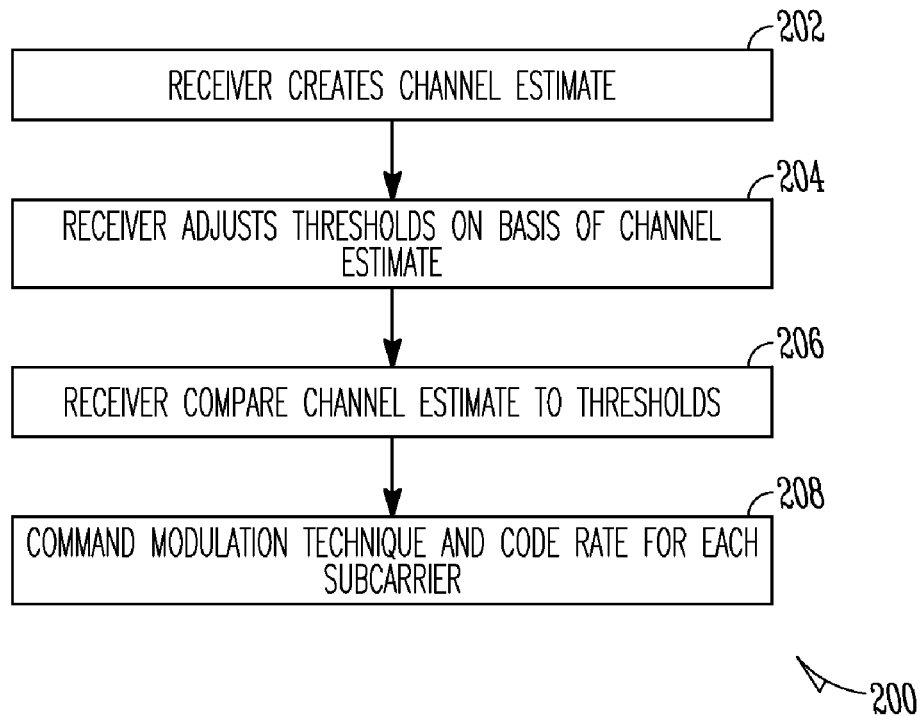
FIG. 2 depicts a method by which transceivers in communication with one another may adjust power thresholds in response to a channel estimate, in accordance with some embodiments of the present invention.

A method 200 for changing power thresholds (e.g., $T_1$-$T_4$) in response to a constantly changing channel is depicted in FIG. 2. Initially, the receiver (e.g., transceiver 102) creates a channel estimate, as shown in operation 202. A channel estimate is akin to a channel transfer function, it is a characterization of the effect of a physical medium on an input sequence. Thus, given knowledge regarding the signal emitted by transceiver 100, and given knowledge of the channel estimate, one can estimate the signal observed by the receiver (e.g., transceiver 102). Methods by which a channel estimate may be obtained are described below, with reference to FIG. 3-5.

After obtaining the channel estimate, the receiver (e.g., transceiver 102) may adjust the power thresholds, as shown in operation 204. Discussion regarding adjusting the power thresholds is provided below. After having adjusted the power thresholds, the receiver compares the channel estimate to the newly arrived-at power thresholds, as shown in operation 206. Based upon the comparison in operations 206, the receiver transmits a message to the transmitter, instructing the transmitter to employ particular modulation techniques on particular subcarriers (operation 208). The receiver may also instruct the transmitter to employ a particular code rate in its encoder, given the comparison in operation 206.

The method 200 of FIG. 2 may be executed periodically throughout the span of a communication connection between a given transmitter and receiver. Thus, with each iteration of the method 200, a new channel estimate may be obtained, the power thresholds may be adjusted, and new modulations techniques (and code rates, if desired) may be assigned to each of the subcarriers.

In some embodiments, the method 200 of FIG. 2 is executed periodically during the course of a communication connection. Channel estimates and/or statistics or metrics describing the channel estimates arrived at in operation 204 are stored with each iteration of the method 200. One example of a statistic that may be tracked is aggregate power in the signals carried on the subcarriers. Thus, aggregate power may be tracked over the course of a communication connection, and the power thresholds may be adjusted on the basis of the aggregate power.

For example, if aggregate power increases, the power thresholds may be decreased. Such an adjustment strategy may be advantageous if real-time data (e.g., voice, video, etc.) is being communicated. Because of the increased aggregate power, data integrity may remain largely unaltered, while lowering of the power thresholds may result in an increased data rate. On the other hand, if the data being communicated demands low bit error rates (e.g., the data is software), then the power thresholds may be increased. Such an adjustment may decrease the data rate, but may improve data integrity—a quality of significance for the transfer of data such as software.

If aggregate power is observed to decrease, the power thresholds may be decreased. Optionally, the code rates employed may be decreased, as well. Such an adjustment strategy may be useful if data that requires timely delivery is being communicated (e.g., real-time data described above). Because of the decreased thresholds and decreased code rates, the overall data rate may remain largely unchanged, while the lowering of the code rate may offset the negative effects of the drop in aggregate power. On the other hand, if the data being communicated demands low bit error rates, then the power thresholds may be increased. Again, such an adjustment may decrease the data rate, but may improve data integrity. Further discussion of adjustment strategies is presented in connection with FIG. 6.

Figure 3:
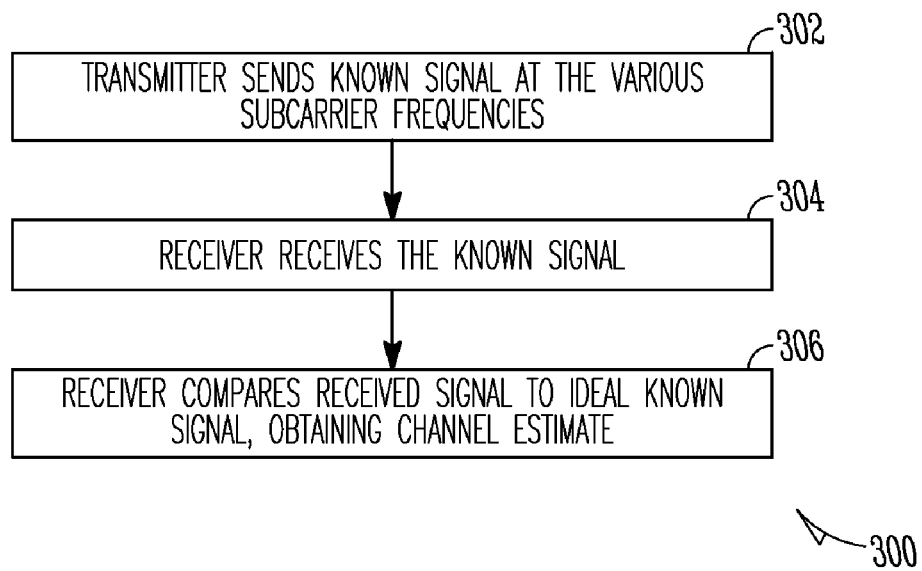
FIG. 3 depicts a method by which two transceivers may cooperate, in order to arrive at a channel estimate, in accordance with some embodiments of the present invention.

FIG. 3 depicts a method 300 by which a channel estimate may be arrived at. Initially, the transmitter sends a signal having known amplitude and phase components at the various subcarrier frequencies, as shown in operation 302 (such a signal may be referred to as a sounding signal). The receiver contains a memory unit that stores these amplitudes and phases, meaning that the receiver possesses a priori knowledge regarding the frequency and phase content of the sounding signal. Thereafter, the receiver receives the sounding signal (operation 304). Finally, as shown in operation 306, the receiver extracts the phase and amplitude content of the received sounding signal and compares it with the stored "ideal" amplitude and phase information. Any discrepancy between the extracted and ideal amplitude and phase information is assumed to be caused by the channel, meaning that a channel estimate may be arrived at by such comparison.

Figure 4:
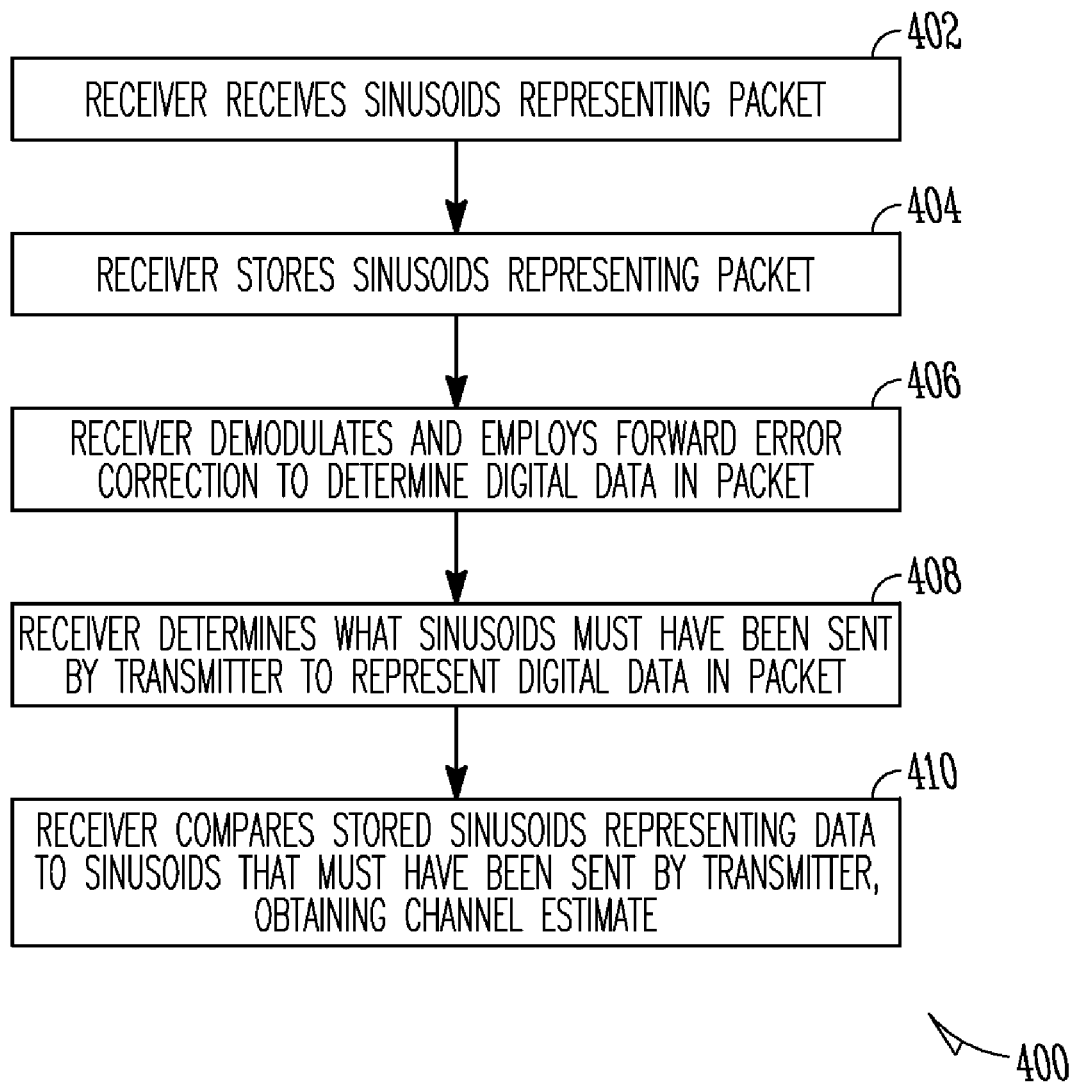
FIG. 4 depicts a method by which a transceiver may arrive at a channel estimate, in accordance with some embodiments of the present invention.

FIG. 4 depicts another method 400 by which a channel estimate may be arrived at. The method 400 described with reference to FIG. 4 may be performed with the reception of each new packet of data, and does not require the use of a sounding signal. Initially, as shown in operation 402, the receiver receives a set of transmission symbols representing a packet of data sent from the transmitter. Next, as shown in operation 404, the phase and amplitude content of the received signal at the subcarrier frequencies is extracted and stored. Thus, by virtue of operation 404, the receiver "remembers" the phase and amplitude content of the received signals associated with the data packet received in operation 402.

Next, as shown in operation 406, the data packet is demodulated and operated upon by a forward error correction system to determine the digital data contained in the packet received in operation 402. In light of the knowledge of the data content of the packet, the receiver determines the phase and amplitude content that ideally should have been present, at each subcarrier frequency, in the signal representing the data packet (operation 408). Thus, by virtue of operation 408, the receiver has obtained "ideal" phase and amplitude content of the signal associated with the data packet received in operation 402.

Finally, as shown in operation 410, the phase and amplitude information stored in operation 404 is compared with the "ideal" phase and amplitude information arrived at in operation 408. Any discrepancy between the extracted and "ideal" amplitude and phase information is assumed to be caused by the channel, meaning that a channel estimate may be arrived at by such comparison.

Figure 5:
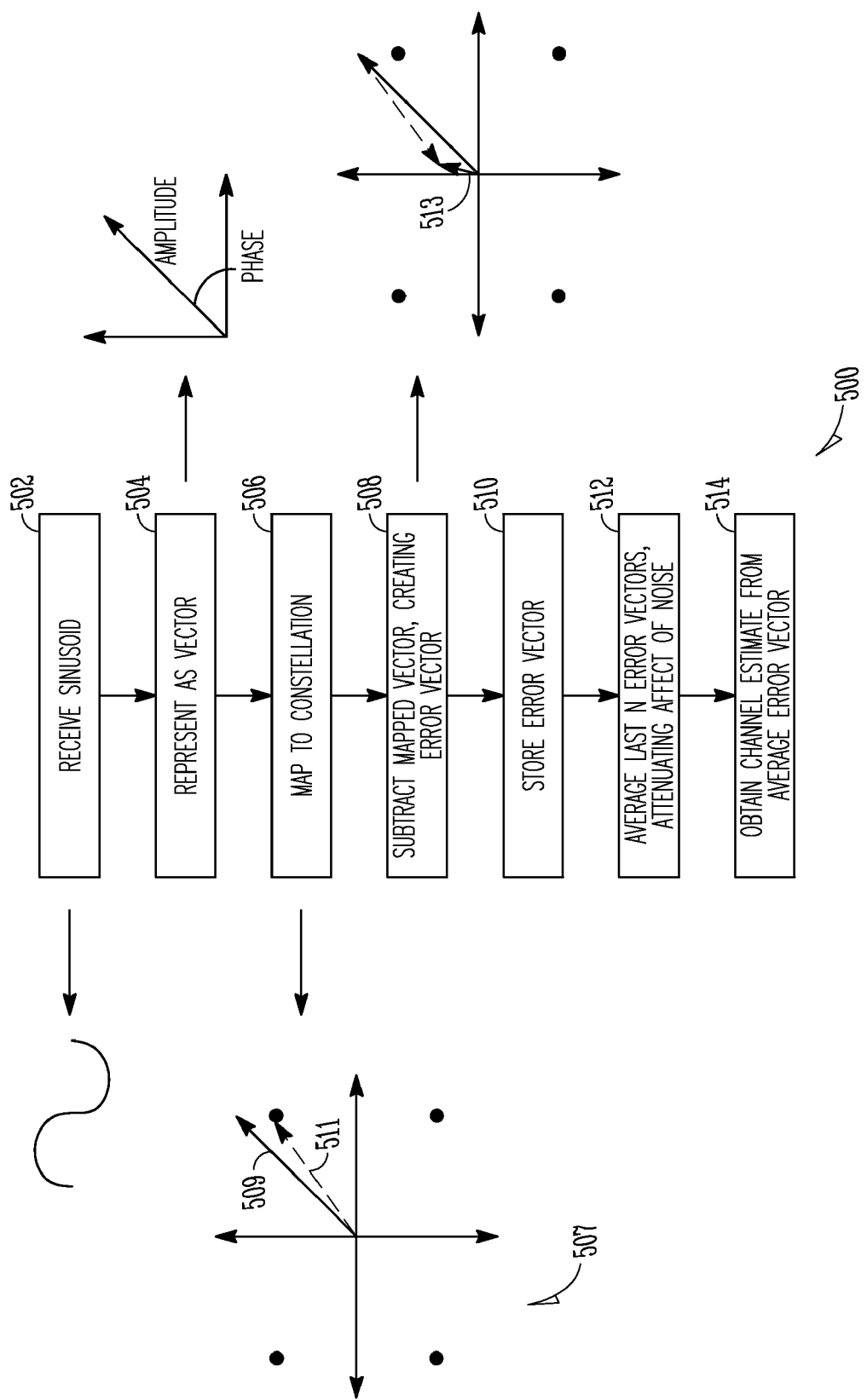
FIG. 5 depicts another method by which a transceiver may arrive at a channel estimate, in accordance with some embodiments of the present invention.

FIG. 5 depicts yet another method 500 by which a channel estimate may be arrived at. The method 500 depicted in FIG. 5 may be referred to as the "coarse estimate" method, and may be performed on a subcarrier-by-subcarrier basis. This method 500 may be performed with the reception of each transmission symbol.

Initially, as shown in operation 502, a transmission symbol (i.e., a sinusoid of a given amplitude and phase) carried on a given subcarrier is received. Next, as shown in operation 504, the sinusoid is represented as a vector. The amplitude of the received sinusoid determines the amplitude of the vector; the phase of the received sinusoid determines the angle between the vector and the x-axis. The vector created in operation 504 is mapped to a constellation that represents the transmission symbols permitted in the given modulation scheme (operation 506). Thus, as shown in constellation 507, the vector 509 determined in operation 504, is mapped to the nearest point in the constellation 507, resulting in a mapped vector 511.

In operation 508, the mapped vector 511 is subtracted from the vector created in operation 504, resulting in an error vector 513. The error vector 513 represents the difference between the received sinusoid and the sinusoid that should have been received, assuming that the sinusoid that should have been received is represented by the point to which the received vector 509 was mapped in operation 506. As shown in operation 510, the error vector 513 is stored in memory by the receiver.

Next, as shown in operation 512, the last N error vectors for a given subcarrier are averaged together in order to attenuate the effect of noise, thereby isolating the effect of the channel on the signal. The number of error vectors averaged together is a design choice that is influenced, by (amongst other factors) the rate at which the channel characteristics change and the amount of noise present in the channel.

Finally, as shown in operation 514, a channel estimate may be obtained from the average error vector calculated in operation 512 for each of the subcarriers.

Figure 6:
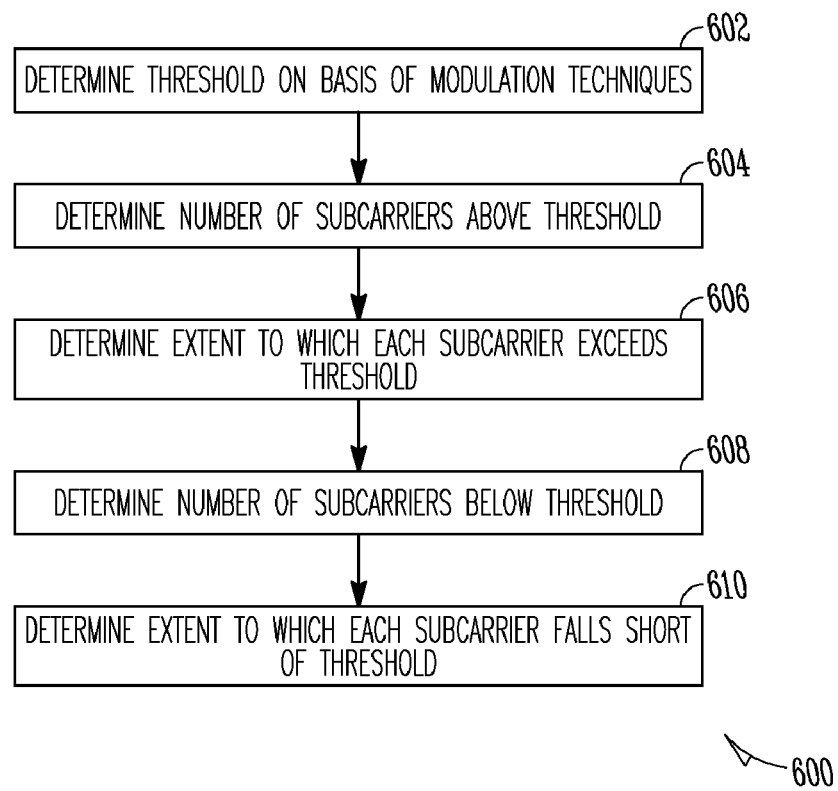
FIG. 6 depicts a method by which a channel estimate may be assessed, in accordance with some embodiments of the present invention.

FIG. 6 depicts a method 600 by which a channel estimate may be analyzed. First, as shown in operation 602, a power threshold is determined on the basis of the modulation techniques employed by the transmitter (e.g., a power level of −20 db is generally thought to be required for BPSK, therefore −20 db may be chosen as a power threshold).

After selection of the threshold in operation 602, the number of subcarriers exhibiting a signal power greater than the threshold is determined and stored (operation 604). Further, the extent to which each subcarrier exceeds the threshold is determined and stored (operation 606). Additionally, in operation 608, the number of subcarriers exhibiting a signal power greater than the threshold is determined and stored. Again, the extent to which each subcarrier falls short of the threshold is determined and stored (operation 610).

The information developed by the method of FIG. 6 may reveal the existence of particularly weak subcarriers. In response to such knowledge, the receiver may instruct the transmitter to use a lower code rate.

On the basis of the information determined by the method 600 of FIG. 6, the power thresholds described with reference to FIG. 1 ($T_1$-$T_4$) may be adjusted. Alternatively, a unique set of power thresholds may be determined for each subcarrier (e.g., the power level required for 64-QAM transmission on subcarrier $S_1$ may be different from that required for 64-QAM transmission on subcarrier $S_2$).

Figure 7:
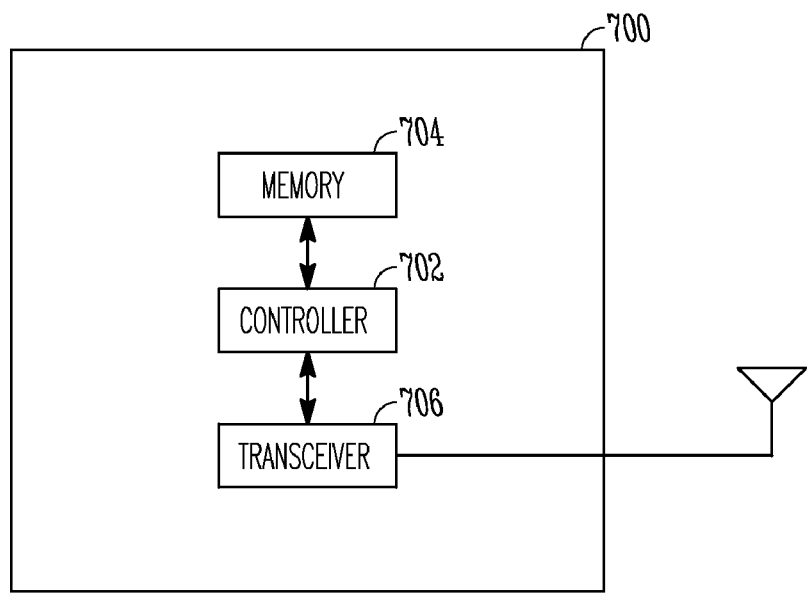
FIG. 7 depicts a wireless device that may execute one or more of the methods and schemes described with reference to FIGS. 1-6, in accordance with some embodiments of the present invention.

FIG. 7 depicts a wireless device 700 that may perform one or more of the methods and schemes described with reference to FIGS. 1-6. As can be seen from FIG. 7, the wireless device 700 includes a controller 702 that is coupled to a memory unit 704 and a transceiver 706. The memory unit 704 may store a set of instructions that, when executed, cause the controller 702 to perform the methods and schemes recited with reference to FIG. 1-6. Of course, the memory unit 704 and controller 702 may be alternatively embodied as an application-specific integrated circuit.

The transceiver 706 may include transmission and reception circuitry. An example of transmission circuitry that may be included in the transceiver 706 is described with reference to FIG. 8. An example of the reception circuitry that may be included in the transceiver 706 is described with reference to FIG. 9. Of course, the various elements of FIGS. 8 and 9 may be combined, and need not necessarily be duplicated in the context of the design of the transceiver 706. Other forms of transceivers are known, and are acceptable for use with the methods and schemes described herein.

The transceiver 706 is coupled to at least one antenna 708. The transceiver 706 may be coupled to more than one antenna 708, as may be the case in the context of a multiple input multiple output system. In the context of a multiple input multiple output system, the methods and schemes described herein may be performed for one or more of the spatial channels.

Figure 8:
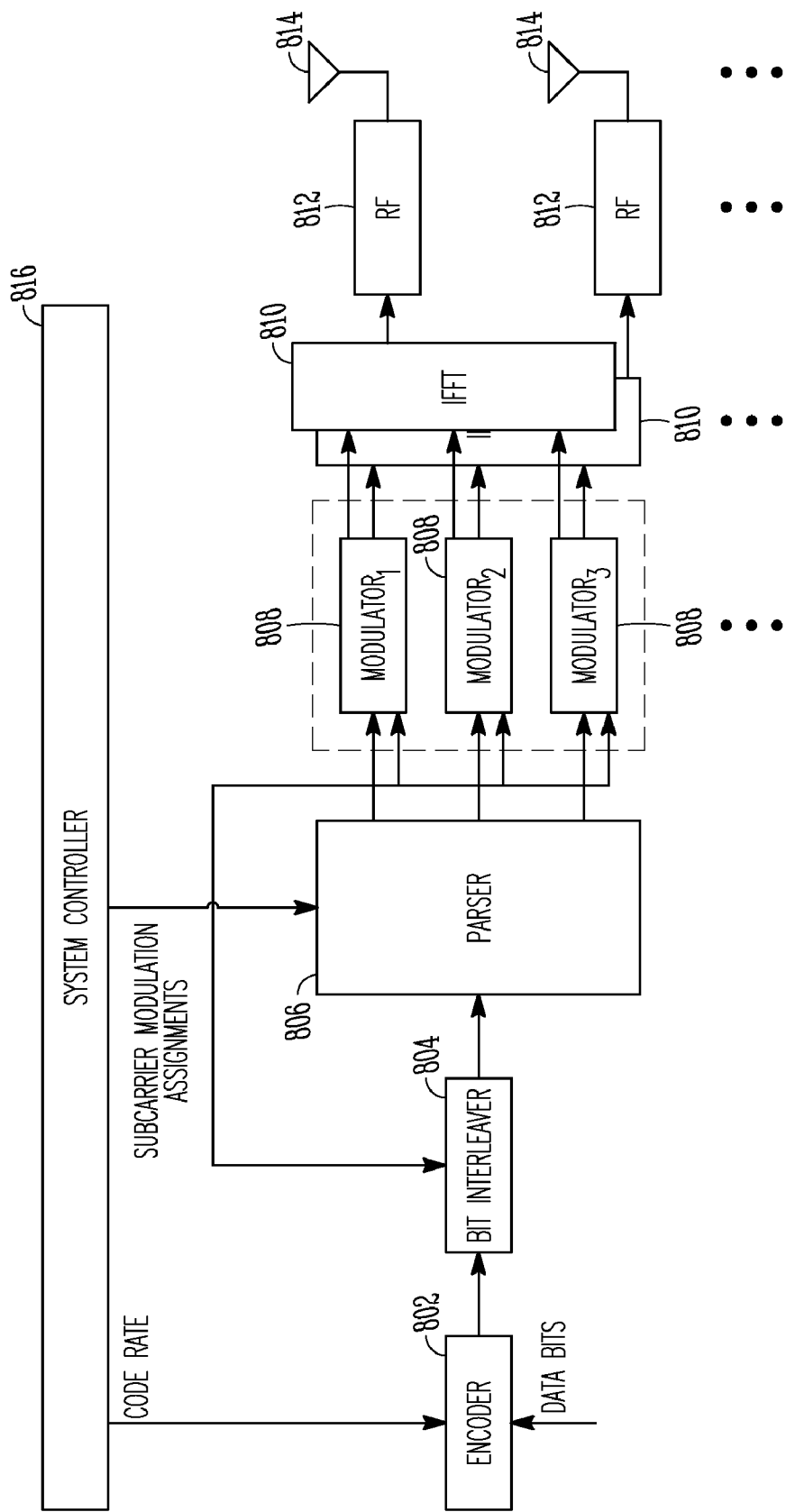
FIG. 8 depicts a transmitter, in accordance with some embodiments of the present invention.

FIG. 8 is a block diagram of a transmitter 800 in accordance with some embodiments of the present invention. Transmitter 800 may be part of a wireless communication device, and may transmit orthogonal frequency division multiplexed (OFDM) communication signals.

In accordance with some embodiments, transmitter 800 may individually symbol-modulate the subcarriers in accordance with individual subcarrier modulation assignments. Accordingly, one or more bits may be represented by a symbol modulated on a subcarrier. The modulation assignments for each subcarrier may be based on the channel characteristics or channel conditions, as was discussed previously.

In some embodiments, the subcarrier modulation assignments may range from zero bits per symbol to up to ten or more bits per symbol. In terms of modulation levels, the spatial-frequency subcarrier modulation assignments may comprise binary phase shift keying (BPSK), which communicates one bit per symbol, quadrature phase shift keying (QPSK), which communicates two bits per symbol, 8 PSK, which communicates three bits per symbol, 16-quadrature amplitude modulation (16-QAM), which communicates four bits per symbol, 32-QAM, which communicates five bits per symbol, 64-QAM, which communicates six bits per symbol, 128-QAM, which communicates seven bits per symbol, and 256-QAM, which communicates eight bits per symbol. Subcarrier modulation assignments with higher data communication rates per subcarrier (e.g., ten bits) may also be used.

The transmitter 800 may transmit symbols on a communication channel within a predetermined frequency spectrum. In some embodiments, the orthogonal subcarriers of a channel may be closely spaced OFDM subcarriers. To achieve orthogonality between the closely spaced subcarriers, the subcarriers of a particular channel may exhibit no energy at frequencies substantially equal to center frequencies of the other subcarriers of that channel.

In accordance with some embodiments, data for transmission is provided to transmitter 800 in the form of a bit stream. An encoder 802 may apply forward error correcting (FEC) codes to bit stream to generate coded bits. A bit interleaver 804 may perform an interleaving operation on a block of bits to generate interleaved block of bits. The interleaving operation performed by the interleaver 804 may operate so as to ensure that correlated bits are not represented by the same transmission symbol. A parser 806 may parse blocks of bits into groups of bits having a variable number of coded bits. The variable number of coded bits of a group may be determined by the subcarrier modulation assignments. Subcarrier modulation assignments are generated by the controller 816. The controller 816 may obtain the assignments by command of a remote receiver, as discussed below. Subcarrier modulators 808 may individually modulate groups of bits on corresponding subcarriers in accordance with the subcarrier modulation assignments to generate symbol-modulated subcarriers. In some embodiments, the parser 806 may include a serial-to-parallel conversion to provide the groups of bits in a parallel form to subcarrier modulators 808.

Inverse Fast Fourier transform (IFFT) circuitry 810 may perform IFFTs on symbol-modulated subcarriers to generate time domain representations of the symbol-modulated subcarriers. Almost any form of inverse discrete Fourier transform (IDFT) may be used to perform the inverse transform operation.

IFFT circuitry 810 may also convert the time domain samples generated by the IFFT operation, which may be in a parallel form, to one or more serial symbol streams. IFFT circuitry 810 may also add a cyclic extension (or guard interval) to reduce inter-symbol interference in the channel. Radio frequency (RF) circuitry 812 may prepare each of the serial symbol streams for RF transmission.

In some embodiments, each of the antennas 814 are spatially diverse and are associated with individual spatial channels. In some embodiments only a single antenna 814 is used. If more than one antenna is used, each antenna 814 may receive RF signals from an associated set of RF circuitry 812. Spatially diverse antennas 814 may be separated by a distance. A minimum separation distance may be based on the wavelength of the frequency spectrum used for communicating. The antennas 814 may comprise one or more directional or omnidirectional antennas, including, for example, dipole antennas, monopole antennas, loop antennas, microstrip antennas or other types of antennas suitable for transmission of RF signals by transmitter 800.

Figure 9:
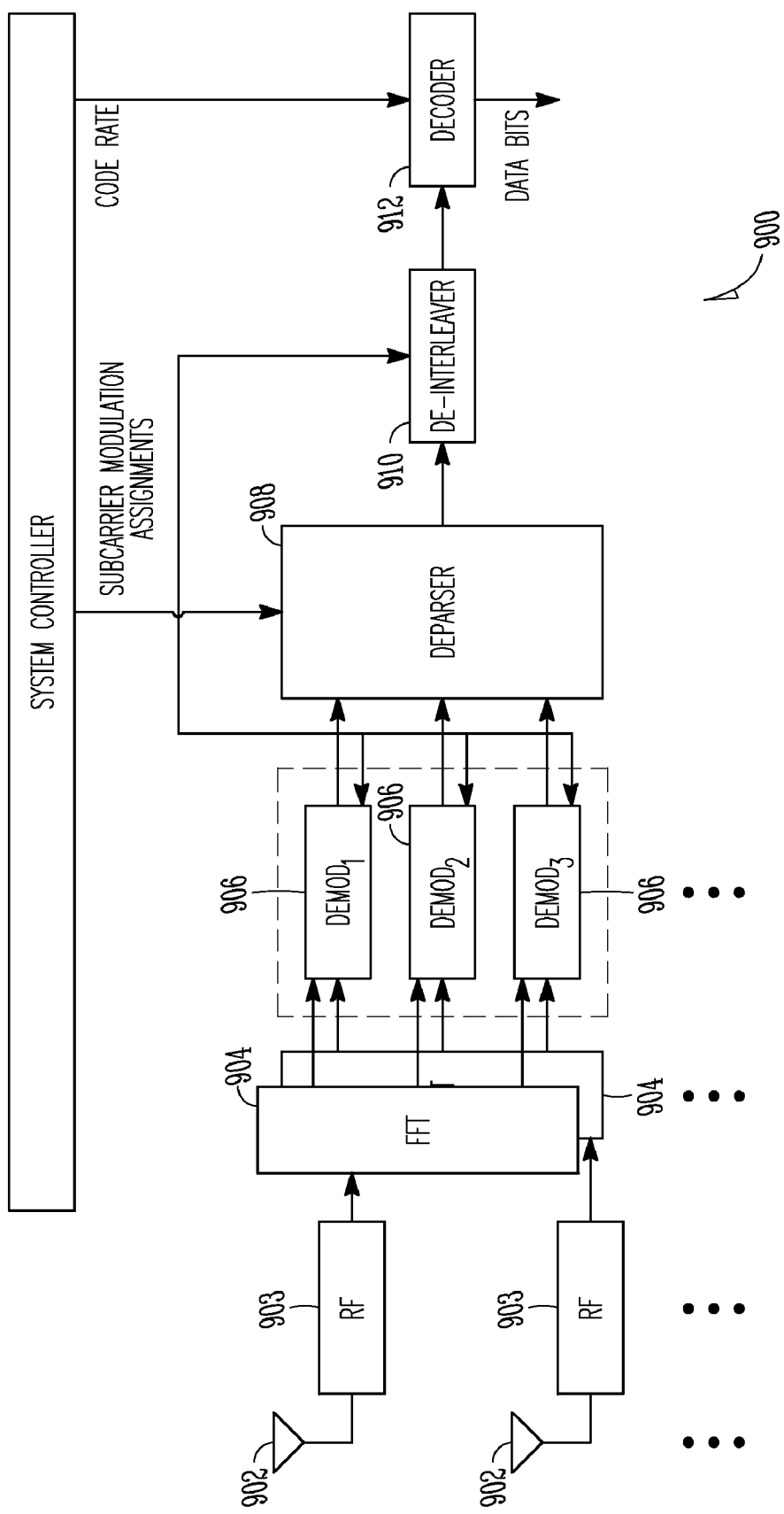
FIG. 9 depicts a receiver, in accordance with some embodiments of the present invention.

FIG. 9 depicts a block diagram of a receiver 900. The receiver 900 includes one or more antennas 902, fast Fourier transform circuitry 904, demodulators 906, a deparser 908, a de-interleaver 910, and a decoder 912. The operation of the receiver is controlled by a system controller 914.

Briefly, the structure of the receiver 900 is essentially the inverse of the transmitter 800. For each functional block in the transmitter 800, a counterpart in the receiver 900 may exist. (Example: the transmitter 800 includes modulators 808, while the receiver 900 includes demodulators 906). A functional block in the receiver 900 performs the inverse operation of its counterpart block in the transmitter 800. Accordingly, the receiver 900 may include one or more antennas 902 and RF circuitry 903 to receive symbols, which may have propagated through a plurality of spatial channels. The receiver 900 may also include fast Fourier transform (FFT) circuitry 904 to generate frequency domain representations of the symbols received on the subcarriers. The receiver 900 may also include subcarrier demodulators 906 to demodulate frequency domain representations for each subcarrier in accordance with the subcarrier modulation assignments, to generate groups of bits. The receiver 900 may also include a deparser 908 to combine groups of bits to generate blocks of coded bits representing the symbols carried on the various subcarriers. A de-interleaver 910 may perform a deinterleaving operation on block of coded bits, and a decoder 912 may decode the blocks of bits to generate decoded bit sequence.

Embodiments of the invention may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disc storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter lies in less than all features of a single disclosed embodiment. Thus, the following claims are hereby incorporated into the detailed description, with each claim standing on its own as a separate preferred embodiment.

The claimed invention is:

1. A wireless communication device comprising:
    a transceiver arranged to receive data from a remote transmitter on a plurality of subcarriers;
    a channel estimator to measure a power level conveyed by each subcarrier; and
    a controller coupled to the transceiver and to the channel estimator to quantify the subcarriers exhibiting power levels meeting or exceeding each of a plurality of power thresholds, and to select a modulation criteria for each of the subcarriers based at least in part on the power thresholds, wherein subcarriers having power levels meeting or exceeding a particular threshold are selected to have a same modulation criteria;
    wherein the controller is configured to track an aggregate power of subcarriers measured over time,
    wherein when data having a higher bit-error-rate (BER) is to be received and the aggregate power decreases, the controller is configured to decrease the power thresholds to result in an approximately unchanged data rate, and wherein when data having a lower BER is to be received and the aggregate power decreases, the controller is configured to increase the power thresholds to result in a decreased data rate to at least maintain data integrity.

2. The device of claim 1, wherein the quantification is a count of the number of subcarriers carrying a signal exhibiting a power level meeting or exceeding the threshold.

3. The device of claim 1, wherein the modulation criteria includes a quantification of subcarriers carrying a signal exhibiting a power level falling short of a threshold.

4. The device of claim 3, wherein the quantification is a count of the number of subcarriers carrying a signal exhibiting a power level falling short of the threshold.

5. A method comprising:
receiving a plurality of signals carried through a channel on a plurality of subcarriers;
measuring a power level conveyed by each subcarrier at each of the subcarrier frequencies;
quantifying the subcarriers exhibiting power levels meeting or exceeding each of a plurality of power thresholds; and
selecting modulation criteria for each of the subcarriers based at least in part on the power thresholds-wherein subcarriers having power levels meeting or exceeding a particular threshold are selected to have a same modulation criteria;
tracking an aggregate power of subcarriers measured over time,
wherein when data having a higher bit-error-rate (BER) is to be received and the aggregate power decreases, decreasing the power thresholds to result in an approximately unchanged data rate, and
wherein when data having a lower BER is to be received and the aggregate power decreases, increasing the power thresholds to result in a decreased data rate to at least maintain data integrity.

6. The method of claim 5, further comprising:
commanding a remote transmitter to employ a particular code rate on a particular subcarrier, if the power of the signal carried on the particular subcarrier meets or exceeds the power threshold.

7. The method of claim 5, further comprising:
adjusting a second power threshold based at least in part on the estimated effects of the channel, wherein the second modulation technique is to be used on a given subcarrier if the power of the signal carried on the given subcarrier meets or exceeds the second power threshold, and a third modulation technique is to be used on the given subcarrier if the power of the signal carried on the given subcarrier falls short of the second power threshold.

8. The method of claim 5, wherein estimating the effects of the channel is performed by calculating an average error vector exhibited at each subcarrier frequency.

9. A system comprising:
a transceiver arranged to receive data from a remote transmitter on a plurality of subcarriers;
an omnidirectional antenna coupled to the transceiver;
a channel estimator to measure a power level conveyed by each subcarrier;
a controller coupled to the transceiver and to the channel estimator to quantify the subcarriers exhibiting power levels meeting or exceeding each of a plurality of power thresholds, and to select a modulation criteria for each of the subcarriers based at least in part on which one of the power thresholds a particular subcarrier meets or exceeds, wherein subcarriers having power levels meeting or exceeding a particular threshold are selected to have a same modulation criteria;
wherein the controller is configured to track an aggregate power of subcarriers measured over time,
wherein when data having a higher bit-error-rate (BER) is to be received and the aggregate power decreases, the controller is configured to decrease the power thresholds to result in an approximately unchanged data rate, and
wherein when data having a lower BER is to be received and the aggregate power decreases, the controller is configured to increase the power thresholds to result in a decreased data rate to at least maintain data integrity.

10. The system of claim 9, wherein the quantification is a count of the number of subcarriers carrying a signal exhibiting a power level meeting or exceeding the threshold.

11. The system of claim 9, wherein the modulation criteria includes a quantification of subcarriers carrying a signal exhibiting a power level falling short of a threshold.

12. The system of claim 11, wherein the quantification is a count of the number of subcarriers carrying a signal exhibiting a power level falling short of the threshold.

13. A computer-readable medium that stores instructions, which if executed by one or more processors, causes the one or more processors to perform to perform operations comprising:
measuring a power level conveyed by each subcarrier at each of the subcarrier frequencies;
quantifying the subcarriers exhibiting power levels meeting or exceeding each of a plurality of power thresholds; and
selecting modulation criteria for each of the subcarriers based at least in part on the power thresholds-wherein subcarriers having power levels meeting or exceeding a particular threshold are selected to have a same modulation criteria;
tracking an aggregate power of subcarriers measured over time,
wherein when data having a higher bit-error-rate (BER) is to be received and the aggregate power decreases, decreasing the power thresholds to result in an approximately unchanged data rate, and
wherein when data having a lower BER is to be received and the aggregate power decreases, increasing the power thresholds to result in a decreased data rate to at least maintain data integrity.

14. The medium of claim 13, further comprising:
commanding a remote transmitter to employ a particular code rate on a particular subcarrier, if the power of the signal carried on the particular subcarrier meets or exceeds the power threshold.

15. The medium of claim 13, further comprising:
adjusting a second power threshold based at least in part on the estimated effects of the channel, wherein the second modulation technique is to be used on a given subcarrier if the power of the signal carried on the given subcarrier meets or exceeds the second power threshold, and a third modulation technique is to be used on the given subcarrier if the power of the signal carried on the given subcarrier falls short of the second power threshold.

16. The medium of claim 13, wherein estimating the effects of the channel is performed by calculating an average error vector exhibited at each subcarrier frequency.

* * * * *

UNITED STATES PATENT AND TRADEMARK OFFICE
CERTIFICATE OF CORRECTION

| | |
|---|---|
| PATENT NO. | : 7,693,224 B2 |
| APPLICATION NO. | : 11/094827 |
| DATED | : April 6, 2010 |
| INVENTOR(S) | : Valentine J. Rhodes |

Page 1 of 1

It is certified that error appears in the above-identified patent and that said Letters Patent is hereby corrected as shown below:

In column 10, line 26, in claim 13, after "processors" delete "to perform" (2nd occur.)

Signed and Sealed this

Tenth Day of August, 2010

David J. Kappos
*Director of the United States Patent and Trademark Office*